United States Patent
Cook et al.

(10) Patent No.: US 8,679,273 B2
(45) Date of Patent: Mar. 25, 2014

(54) SYSTEMS AND METHODS FOR PROVIDING VACUUM ENCAPSULATION FOR CLIMATE CONTROL PANELS

(75) Inventors: Brent Thurman Cook, Salt Lake City, UT (US); Joseph Byron Alexander, Salt Lake City, UT (US); Jorge Gustavo Gatica, Lehi, UT (US); Ballard T. White, Provo, UT (US); A. Brent Strong, Sandy, UT (US)

(73) Assignee: Celestia, LLC, Salt Lake City, UT (US)

( * ) Notice: Subject to any disclaimer, the term of this patent is extended or adjusted under 35 U.S.C. 154(b) by 628 days.

(21) Appl. No.: 12/942,898

(22) Filed: Nov. 9, 2010

(65) Prior Publication Data
US 2011/0189430 A1    Aug. 4, 2011

Related U.S. Application Data

(60) Provisional application No. 61/259,733, filed on Nov. 9, 2010, provisional application No. 61/300,372, filed on Feb. 1, 2010.

(51) Int. Cl.
*B32B 37/06*    (2006.01)
(52) U.S. Cl.
USPC ......... 156/145; 156/285; 156/272.2; 156/147

(58) Field of Classification Search
USPC .................. 156/104, 145, 290, 292; 52/783.1, 52/784.1; 428/316.6, 116
See application file for complete search history.

(56) References Cited

U.S. PATENT DOCUMENTS 5,270,092 A * 12/1993 Griffith et al. ................. 428/69
2003/0157284 A1 * 8/2003 Tanimoto et al. ............ 428/36.1

* cited by examiner

*Primary Examiner* — Katarzyna Wyrozebski Lee
*Assistant Examiner* — Vishal I Patel
(74) *Attorney, Agent, or Firm* — Michael F. Krieger; Kirton McConkie

(57) ABSTRACT

A climate control system according to implementations of the invention includes one or more vacuum chambers. The vacuum chamber is encompassed by a chamber wall that is substantially impervious to gases. The vacuum chamber houses one of several combinations. In one combination, the near vacuum has yet to be created, and the vacuum chamber houses substantially-pure carbon dioxide and un-reacted carbon dioxide reducing agent. In a second combination, the near vacuum has been created, and the vacuum chamber houses reaction products of a chemical reaction between substantially-pure carbon dioxide and carbon dioxide reducing agent in a near vacuum. Various methods are used for creating vacuum chambers and for generating near vacuum conditions within such chambers. Various systems and structures can utilize such vacuum chambers and panels containing such chambers.

8 Claims, 14 Drawing Sheets

SYSTEMS AND METHODS FOR PROVIDING VACUUM ENCAPSULATION FOR CLIMATE CONTROL PANELS

CROSS-REFERENCE TO RELATED APPLICATIONS

This application claims the benefit of U.S. Provisional Application No. 61/259,733, filed Nov. 9, 2010 and also claims the benefit of U.S. Provisional Application No. 61/300,372, filed Feb. 1, 2010, both of which are incorporated herein by reference.

BACKGROUND OF THE INVENTION

1. Field of the Invention

The present invention relates to systems for providing insulation and insulation panels, and more particularly to systems and methods for providing vacuum encapsulation for such panels.

2. Background and Related Art

In many instances, it is desirable to provide panels or other structures having a high insulation value to prevent temperature gain and/or loss through the panels or other structures. Many types of materials are used in such panels and structures, but one of the best insulators is a vacuum. It has historically been difficult to manufacture panels and structures utilizing vacuum insulation having adequate structural and other characteristics.

BRIEF SUMMARY OF THE INVENTION

A climate control system according to implementations of the invention includes one or more vacuum chambers. The vacuum chamber is encompassed by a chamber wall that is substantially impervious to gases. The vacuum chamber is configured to encompass a near vacuum and therefore houses one of several combinations. In one combination, the near vacuum has yet to be created, and the vacuum chamber houses substantially-pure carbon dioxide and un-reacted carbon dioxide reducing agent. In a second combination, the near vacuum has been created, and the vacuum chamber houses reaction products of a chemical reaction between substantially-pure carbon dioxide and carbon dioxide reducing agent in a near vacuum.

The carbon dioxide reducing agent use in such implementations may include any agent capable of reacting with substantially-pure gaseous carbon dioxide to form a near vacuum, such as a mixture of calcium oxide and calcium hydroxide, or substantially-pure calcium oxide.

The vacuum chamber may take one of several forms, such as being one of a plurality of connected honeycomb-shaped vacuum chambers separated by aluminized Mylar chamber walls and formed into a panel. In another form, the honeycomb-shaped vacuum chambers are provided by a thermoformed plastic layer. In both types of implementations the panel may include an outer structural member encompassing the plurality of connected vacuum chambers. In another implementation, the vacuum chamber is roughly spherical. In this implementation, the chamber wall may be formed of a plastic layer encased by a non-melt coating and an aluminum coating, forming a vacuum bead. In some such implementations, the vacuum bead is provided with a plurality of point standoffs to reduce conductive heat transfer between the vacuum bead and any surrounding material, including other vacuum beads.

In some implementations, a capsule within the chamber contains the carbon dioxide reducing agent and is a low-melt polymer capsule. In such implementations, heat, infrared radiation, and/or microwaves may be applied to the capsule after the chamber has been sealed to cause opening of the capsule and release of the carbon dioxide reducing agent. In other implementations, the capsule within the chamber is a magnetically-operable membrane capsule. In such implementations, a magnetic force may be applied to cause opening of the capsule and release of the carbon dioxide reducing agent. Other possible methods for opening a capsule include ultrasound and using a capsule membrane that degrades over time in a carbon dioxide atmosphere.

According to implementations of the invention, a method for manufacturing a climate control panel is provided. In one implementation, a first aluminized Mylar sheet having a length and width is provided, and a first plurality of glue strips are attached lengthwise on top of the first aluminized Mylar sheet in a spaced substantially-parallel relationship. A second aluminized Mylar sheet is laid over the first plurality of glue strips to form a sandwich of glue strips between the first and second aluminized Mylar sheets. A second plurality of glue strips are laid lengthwise on top of the second aluminized Mylar sheet in a spaced relationship that is offset from and substantially parallel to the first plurality of glue strips. Another aluminized Mylar sheet is laid over the second plurality of glue strips, forming an additional sandwich layer.

This layering process is repeated multiple times to form a layered composite structure, which is then cut into a section substantially orthogonal to a lengthwise orientation of the glue strips. The section is expanded to form an expanded cell structure having aluminized Mylar ribs separating individual cells. The expanded cell structure is glued to a back aluminized Mylar sheet along one edge of the ribs to form a plurality of closed-back cells, into which substantially-pure carbon dioxide and a low-melt polymer capsule containing carbon-dioxide-reducing chemicals are placed. The cells are then sealed by gluing a front aluminized Mylar sheet along an opposing edge of the ribs.

Additional layers of vacuum cells may be formed by attaching an additional expanded cell structure to the top of the front aluminized Mylar sheet to form a new plurality of closed-back cells. Substantially-pure carbon dioxide and additional low-melt polymer capsules containing carbon-dioxide-reducing chemicals are placed in each of the new plurality of closed-back cells, which are then sealed by gluing a new front aluminized Mylar sheet to a front of the new plurality of closed-back cells to seal off the plurality of closed-back cells.

In at least some implementations, the ribs of the new plurality of closed-back cells are offset from the ribs of the first plurality of closed-back cells. This configuration reduces conductive heat transfer between layers. This configuration may also contribute to structural performance of the panel. Regardless of the number of layers provided, the layers may be encased in and glued to a structural member such as expanded polystyrene. The low-melt polymer capsules are caused to melt and release the carbon-dioxide-reducing chemicals by the application of heat, infrared radiation, and/or microwaves, wherein the carbon dioxide in each cell reacts with the carbon-dioxide-reducing chemicals to form a near vacuum in each of the cells.

In other implementations, the cells are formed from a material such as plastic and may be formed from ribs formed in the plastic. For example, the ribs may be formed using a thermoset process with a thermoset roller. Other methods for manufacturing the cells are within the scope of implementations of the invention.

In other implementations of the invention, a method for manufacturing a climate control system is provided. In such implementations, a vacuum bead is manufactured. The process begins in a substantially-pure carbon dioxide environment, where a hollow plastic sphere having an opening receives a magnetically-operable membrane capsule containing a carbon dioxide reducing agent. The hollow plastic sphere is sealed and then dipped in a non-melt coating. The non-melt-coated sphere is dipped in an aluminum bath. The aluminum-coated sphere is subjected to a magnetic force, whereby the magnetically-operable membrane capsule is caused to open.

Opening the magnetically-operable membrane capsule with the magnetic force causes the reducing agent to react with the carbon dioxide in the aluminum-coated sphere, generating a near vacuum within the aluminum-coated sphere. In some implementations, point standoffs are manufactured as part of or are attached to the vacuum bead. A plurality of the vacuum beads can be used in a variety of fashions, such as forming a panel including a plurality of vacuum beads, blowing a plurality of vacuum beads into a cavity to be insulated, and placing a plurality of vacuum beads into a matrix and molding the matrix and vacuum beads into a desired shape.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
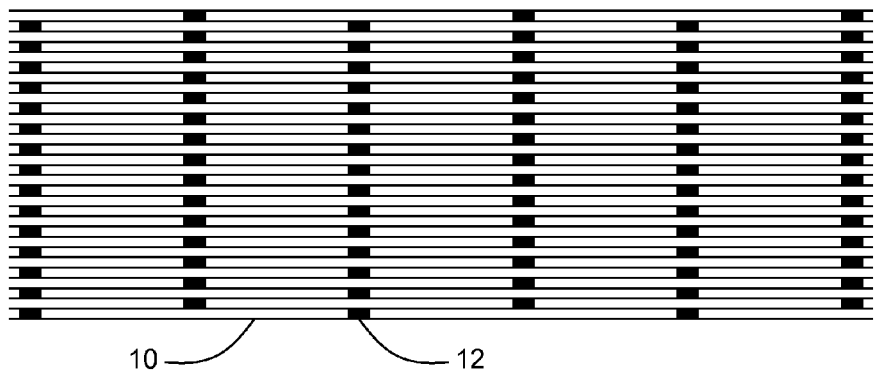
FIG. 1 shows cross-sectional views of examples of a layered structure for use with embodiments of the invention.
Figure 1:
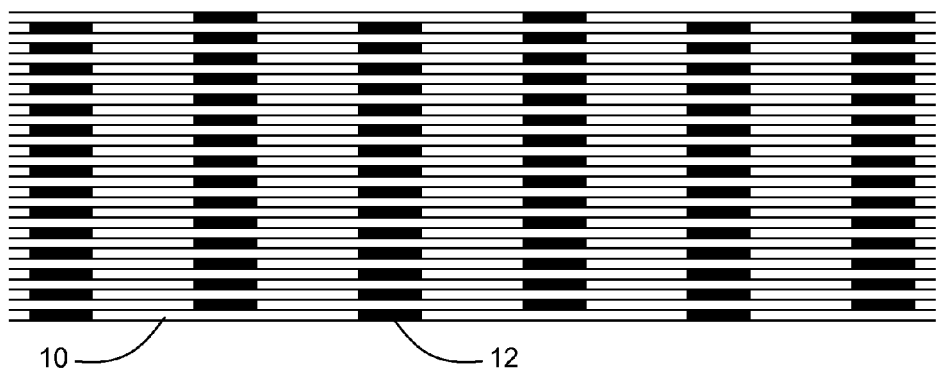

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

A climate control system according to embodiments of the invention includes one or more vacuum chambers. The vacuum chamber is encompassed by a chamber wall that is substantially impervious to gases. The vacuum chamber is configured to encompass a near vacuum and therefore houses one of several combinations. In one combination, the near vacuum has yet to be created, and the vacuum chamber houses substantially-pure carbon dioxide and un-reacted carbon dioxide reducing agent. It may also house a barrier or other structure separating the carbon dioxide and the carbon dioxide reducing agent. In a second combination, the near vacuum has been created, and the vacuum chamber houses reaction products of a chemical reaction between substantially-pure carbon dioxide and carbon dioxide reducing agent in a near vacuum, along with remnants of any barrier or structure previously separating the carbon dioxide and the carbon dioxide reducing agent.

The carbon dioxide reducing agent use in such embodiments may include any agent capable of reacting with substantially-pure gaseous carbon dioxide to form a near vacuum, such as a mixture of calcium oxide and calcium hydroxide, or substantially-pure calcium oxide.

The vacuum chamber may take one of several forms, such as being one of a plurality of connected honeycomb-shaped vacuum chambers separated by aluminized Mylar chamber walls and formed into a panel. In another form, the honeycomb-shaped vacuum chambers are provided by a thermoformed plastic layer. In both types of embodiments the panel may include an outer structural member encompassing the plurality of connected vacuum chambers. In another embodiment, the vacuum chamber is roughly spherical. In this embodiment, the chamber wall may be formed of a plastic layer encased by a non-melt coating and an aluminum coating, forming a vacuum bead. In some such embodiments, the vacuum bead is provided with a plurality of point standoffs to reduce conductive heat transfer between the vacuum bead and any surrounding material, including other vacuum beads.

In some embodiments, a capsule within the chamber contains the carbon dioxide reducing agent and is a low-melt polymer capsule. In such embodiments, heat, infrared radiation, and/or microwaves may be applied to the capsule after the chamber has been sealed to cause opening of the capsule and release of the carbon dioxide reducing agent. In other embodiments, the capsule within the chamber is a magnetically-operable membrane capsule. In such embodiments, a magnetic force may be applied to cause opening of the capsule and release of the carbon dioxide reducing agent. Other possible methods for opening a capsule include ultrasound and using a capsule membrane that degrades over time in a carbon dioxide atmosphere.

According to embodiments of the invention, a method for manufacturing a climate control panel is provided. In one embodiment, a first aluminized Mylar sheet having a length and width is provided, and a first plurality of glue strips are attached lengthwise on top of the first aluminized Mylar sheet in a spaced substantially-parallel relationship. A second aluminized Mylar sheet is laid over the first plurality of glue strips to form a sandwich of glue strips between the first and second aluminized Mylar sheets. A second plurality of glue strips are laid lengthwise on top of the second aluminized Mylar sheet in a spaced relationship that is offset from and substantially parallel to the first plurality of glue strips.

Another aluminized Mylar sheet is laid over the second plurality of glue strips, forming an additional sandwich layer.

This layering process is repeated multiple times to form a layered composite structure, which is then cut into a section substantially orthogonal to a lengthwise orientation of the glue strips. The section is expanded to form an expanded cell structure having aluminized Mylar ribs separating individual cells. The expanded cell structure is glued to a back aluminized Mylar sheet along one edge of the ribs to form a plurality of closed-back cells, into which substantially-pure carbon dioxide and a low-melt polymer capsule containing carbon-dioxide-reducing chemicals are placed. The cells are then sealed by gluing a front aluminized Mylar sheet along an opposing edge of the ribs.

Additional layers of vacuum cells may be formed by attaching an additional expanded cell structure to the top of the front aluminized Mylar sheet to form a new plurality of closed-back cells. Substantially-pure carbon dioxide and additional low-melt polymer capsules containing carbon-dioxide-reducing chemicals are placed in each of the new plurality of closed-back cells, which are then sealed by gluing a new front aluminized Mylar sheet to a front of the new plurality of closed-back cells to seal off the plurality of closed-back cells.

In at least some embodiments, the ribs of the new plurality of closed-back cells are offset from the ribs of the first plurality of closed-back cells. This configuration reduces conductive heat transfer between layers. This configuration may also contribute to structural performance of the panel. Regardless of the number of layers provided, the layers may be encased in and glued to a structural member such as expanded polystyrene. The low-melt polymer capsules are caused to melt and release the carbon-dioxide-reducing chemicals by the application of heat, infrared radiation, and/or microwaves, wherein the carbon dioxide in each cell reacts with the carbon-dioxide-reducing chemicals to form a near vacuum in each of the cells.

In other embodiments, the cells are formed from a material such as plastic and may be formed from ribs formed in the plastic. For example, the ribs may be formed using a thermoset process with a thermoset roller. Other methods for manufacturing the cells are within the scope of embodiments of the invention.

In other embodiments of the invention, a method for manufacturing a climate control system is provided. In such embodiments, a vacuum bead is manufactured. The process begins in a substantially-pure carbon dioxide environment, where a hollow plastic sphere having an opening receives a magnetically-operable membrane capsule containing a carbon dioxide reducing agent. The hollow plastic sphere is sealed and then dipped in a non-melt coating. The non-melt-coated sphere is dipped in an aluminum bath. The aluminum-coated sphere is subjected to a magnetic force, whereby the magnetically-operable membrane capsule is caused to open.

Opening the magnetically-operable membrane capsule with the magnetic force causes the reducing agent to react with the carbon dioxide in the aluminum-coated sphere, generating a near vacuum within the aluminum-coated sphere. In some embodiments, point standoffs are manufactured as part of or are attached to the vacuum bead. A plurality of the vacuum beads can be used in a variety of fashions, such as forming a panel including a plurality of vacuum beads, blowing a plurality of vacuum beads into a cavity to be insulated, and placing a plurality of vacuum beads into a matrix and molding the matrix and vacuum beads into a desired shape.

In the specification and in the claims, the terms "vacuum" and "near vacuum" should be understood to refer not to perfect vacuums but to levels of vacuum providing substantial and significant insulating value when used at normally-encountered atmospheric pressures. For example, near vacuums of approximately 24 millibars are encompassed by the use of the terms "vacuum" and "near vacuum" herein.

In some embodiments of the invention, an insulating panel may be manufactured in a process illustrated with reference to FIGS. 1-4. In the process, multiple layers of aluminized polyethylene terephthalate or biaxially-oriented polyethylene terephthalate (BoPET, commonly known as Mylar) are layered to form a layered structure, which is then cut into strips and expanded to form a honeycomb structure. The honeycomb structures are then stacked one on top of another, separated by additional sheets of aluminized Mylar. As the honeycomb structure is encapsulated between aluminized Mylar sheets, low-melt polymer capsules filled with chemicals are placed in each honeycomb space along with substantially-pure carbon dioxide ($CO_2$) (such as by performing the construction in a pressurized $CO_2$ chamber. After the honeycomb structures are completely sealed, structural panels are attached to the outermost aluminized Mylar skins. The low-melt polymer capsule with its chemicals and the $CO_2$ gas are the only elements remaining in the honeycomb structures, which are sealed against any gas infiltration. Heat is applied to release the chemicals, which then react with the $CO_2$ gas, leading to a chemical reaction absorbing most of the gaseous $CO_2$, leaving each honeycomb chamber at a vacuum of approximately 24 millibars.

Figure 2:
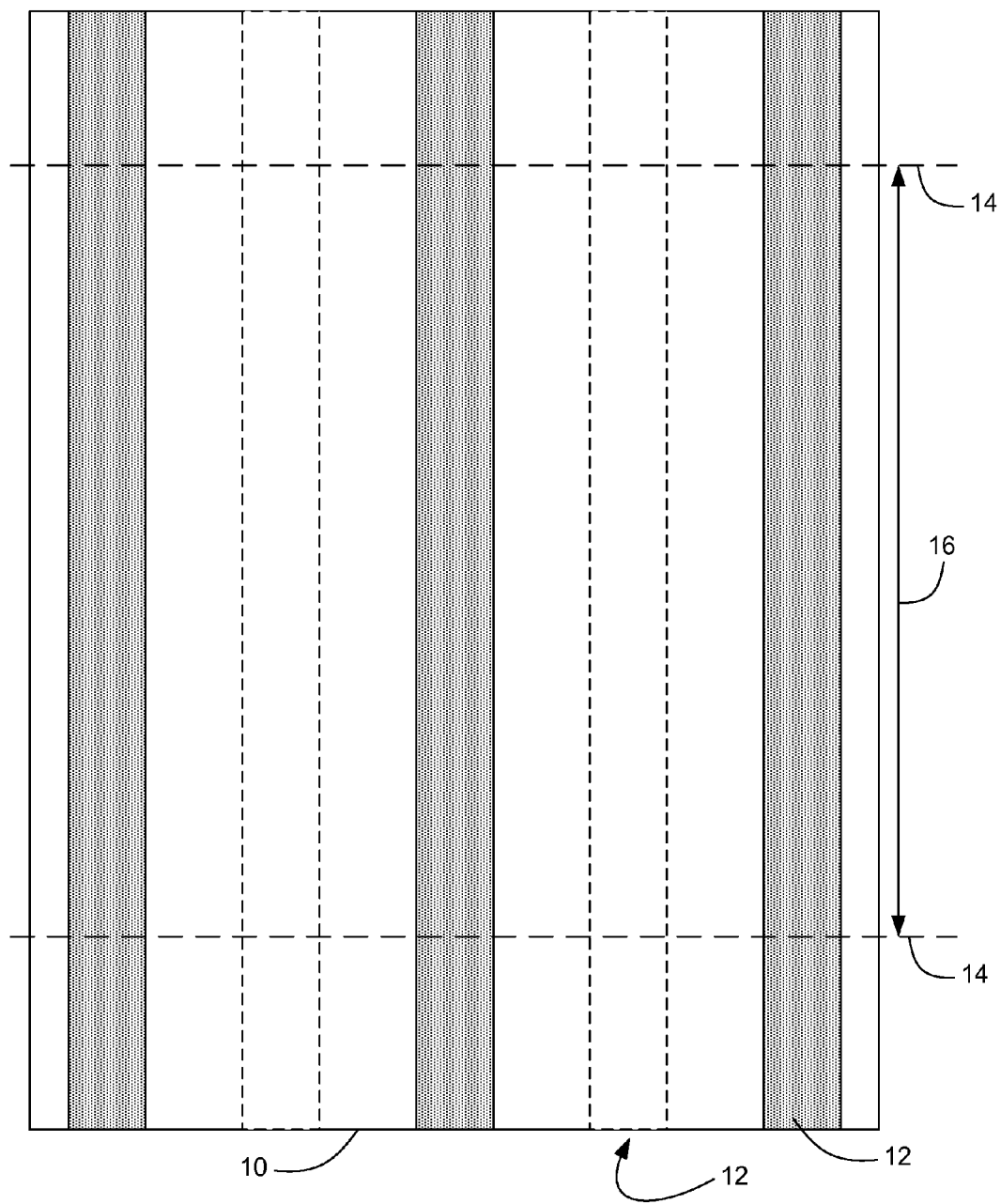
FIG. 2 shows a top view of an example layer of a layered structure for use with embodiments of the invention.

The entire construction process may occur within a substantially-pure $CO_2$ environment, or the $CO_2$ environment may be provided during the portions of the construction where the honeycomb structures are sealed. FIGS. 1 and 2 illustrate various examples and steps taken in the initial layering process. FIG. 1 shows a cross-sectional view of two multi-layer Mylar sheet structures, while FIG. 2 shows a small top view of one layer of a multi-layer Mylar sheet structure. The illustrated Figures are not necessarily to scale, and certain features of the Figures (such as the comparative thicknesses of the various layers) have been exaggerated for purposes of illustration. In the process, a large aluminized Mylar sheet 10 is provided. A plurality of high-quality glue strips 12 are laid down along the length of the first aluminized Mylar sheet 10, in parallel fashion, as shown in FIG. 2. Then, another aluminized Mylar sheet 10 is placed over the first aluminized Mylar sheet 10. The process of placing the glue strips 12 is repeated on top of the second aluminized Mylar sheet 10, offsetting the glue strips 12 from the first glue strips 12 as shown in FIGS. 1 and 2. In FIG. 2, the glue strips 12 on the back side of the aluminized Mylar sheet 10 are shown by dashed lines. The offset distance and the width of the glue strips shown in FIGS. 1 and 2 is chosen to produce a honeycomb structure when the structure is expanded, although various offset distances and/or glue widths may be used, including ones not specifically illustrated in the Figures.

This process is repeated many times. For example, in the two examples shown in FIG. 1, thirty-one aluminized Mylar sheets 10 are joined by thirty layers of the glue strips 12. The last layer is an aluminized Mylar sheet 10 with no glue strips added on top. The large layered structure is then cut orthogonally to the direction of the glue strips 12 into strips, such as strips of approximately one inch. FIG. 2 shows the direction of each cut 14 and a representation of a distance 16 between each successive cut. Each cut section may be quite wide (taken along the line of the cut 14), representing many spaced-apart small segments of the original glue strips 12. The aluminized Mylar composite layered structure is then expanded to form ribs in a honeycomb pattern, such as illustrated in a small section in FIG. 3. The expansion process may be performed using heat and stretching, if desired. It will be realized that the pattern illustrated in FIG. 3 is merely illustrative and may be varied by using different widths of glue strips 14, by varying the spacing between successive glue strips 14, by varying the offsets between glue strips 14 in different layers, and by varying the total amount of expansion between the aluminized Mylar sheets 10.

Figure 3:
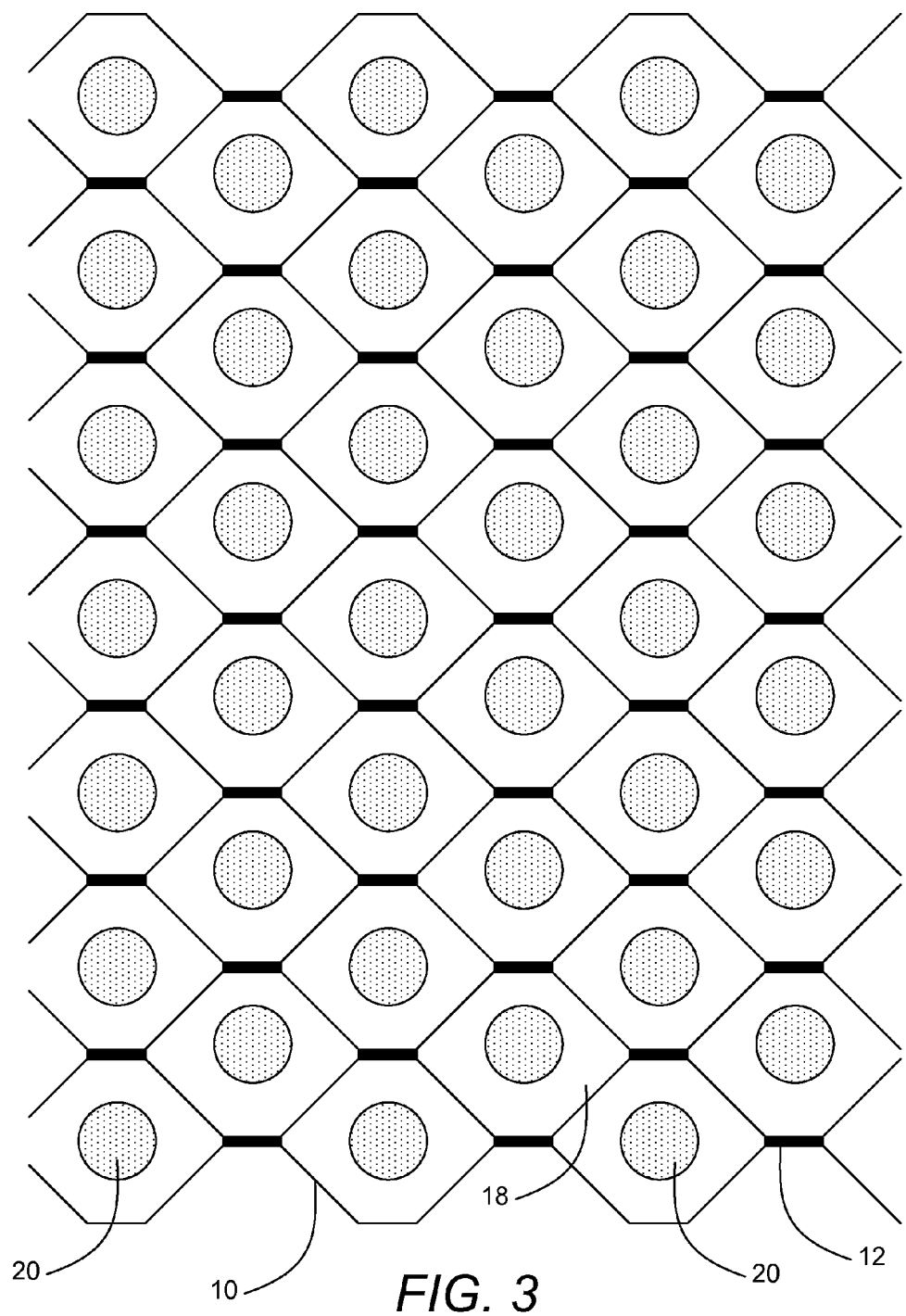
FIG. 3 shows an example of an expanded layered structure for use with embodiments of the invention.

A back side of the aluminized Mylar honeycomb structure shown in FIG. 3 is then fitted with an additional aluminized Mylar sheet (placed orthogonally to the ribs of the expanded layered aluminized Mylar structure shown in FIG. 3) that is glued and cured to the honeycomb rib structure. This process creates a plurality of honeycomb chambers 18, each having honeycomb sides formed by the originally-layered and expanded aluminized Mylar sheets 10 and glue strips 12 and a back formed by the additional, orthogonal, aluminized Mylar sheet.

In one embodiment, low-melt polymer capsules 20 filled with chemicals are placed in each honeycomb chamber 18. Another sheet of aluminized Mylar is then glued to the front of the ribs, sealing off the honeycomb panel. At least this stage of sealing the honeycomb panel occurs in a substantially-pure $CO_2$ environment, such that the low-melt polymer capsules 20 and substantially-pure $CO_2$ gas are the only elements inside each honeycomb chamber 18. In some embodiments of processes for manufacturing panels, additional portions of the processes occur in a substantially-pure $CO_2$ environment, up to substantially the entire process.

Figure 4:
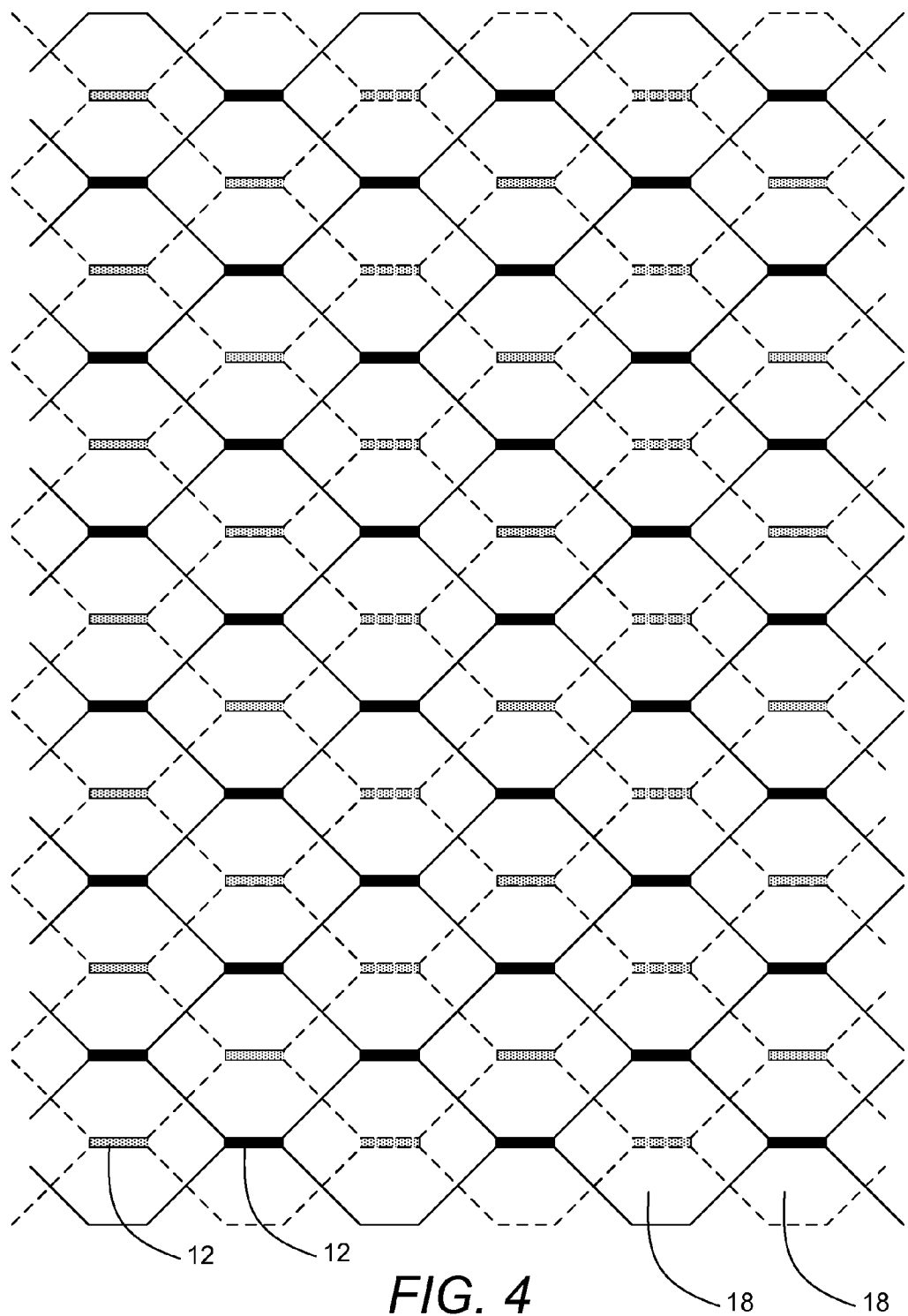
FIG. 4 shows an example of multiple expanded layers stacked together in an offset honeycomb structure for use with embodiments of the invention.

In some embodiments, the process may be repeated one or more times, where the top of one honeycomb layer becomes the back of a next honeycomb layer, as illustrated in FIG. 4. As shown in FIG. 4, each layer may be offset from other layers above or below for structural reasons and/or to reduce conductive heat transfer between layers. The low-melt polymer capsules 20 are not shown in FIG. 4, so as not to obstruct the view of the honeycomb chambers 18 in this embodiment. Whether or not the process is repeated to form a multi-honeycomb-layer structure, structural panels are glued to the outside of the aluminized Mylar skins (bottom of the bottommost honeycomb layer and top of the uppermost honeycomb layer). The structural panels function as a structural diaphragm separated by the aluminized Mylar ribs. As the entire assembly includes air spaces formed by aluminized Mylar, gas infiltration is prevented. Enough heat is applied to the structure to release the chemicals from the low-melt polymer capsules 20. The released chemicals combine with the $CO_2$ present in the honeycomb chambers 18, producing a near vacuum of approximately 24 millibars. A climate-control panel is then insulatingly complete and may be used in the construction of any of a variety of structures.

The process of forming each honeycomb chamber 18 may occur in a vacuum chamber with all of the residual gases extracted from the chamber except for the $CO_2$. For the purpose of describing the process of creating the vacuum in the honeycomb encapsulation, a glass bubble, an example of a clear Christmas tree ball or other like vessel with the reducing agent inside will be used. The process starts in a substantially-pure $CO_2$ environment. There are essentially only $CO_2$ and the reducing agent, which is contained in the low melt polymer capsule 20 inside the vessel. This is how the ball will carry a reducing agent inside it. The reaction to trigger the removal of the $CO_2$ may be caused by infrared, by microwaves, or by heat. The reduction of the $CO_2$ is caused by a mixture of calcium hydroxide and calcium oxide uniting with the $CO_2$. This creates the near vacuum. Of course, it should be understood that other reducing agents/chemical compounds may be used, where appropriate, including pure calcium oxide.

Figure 5:
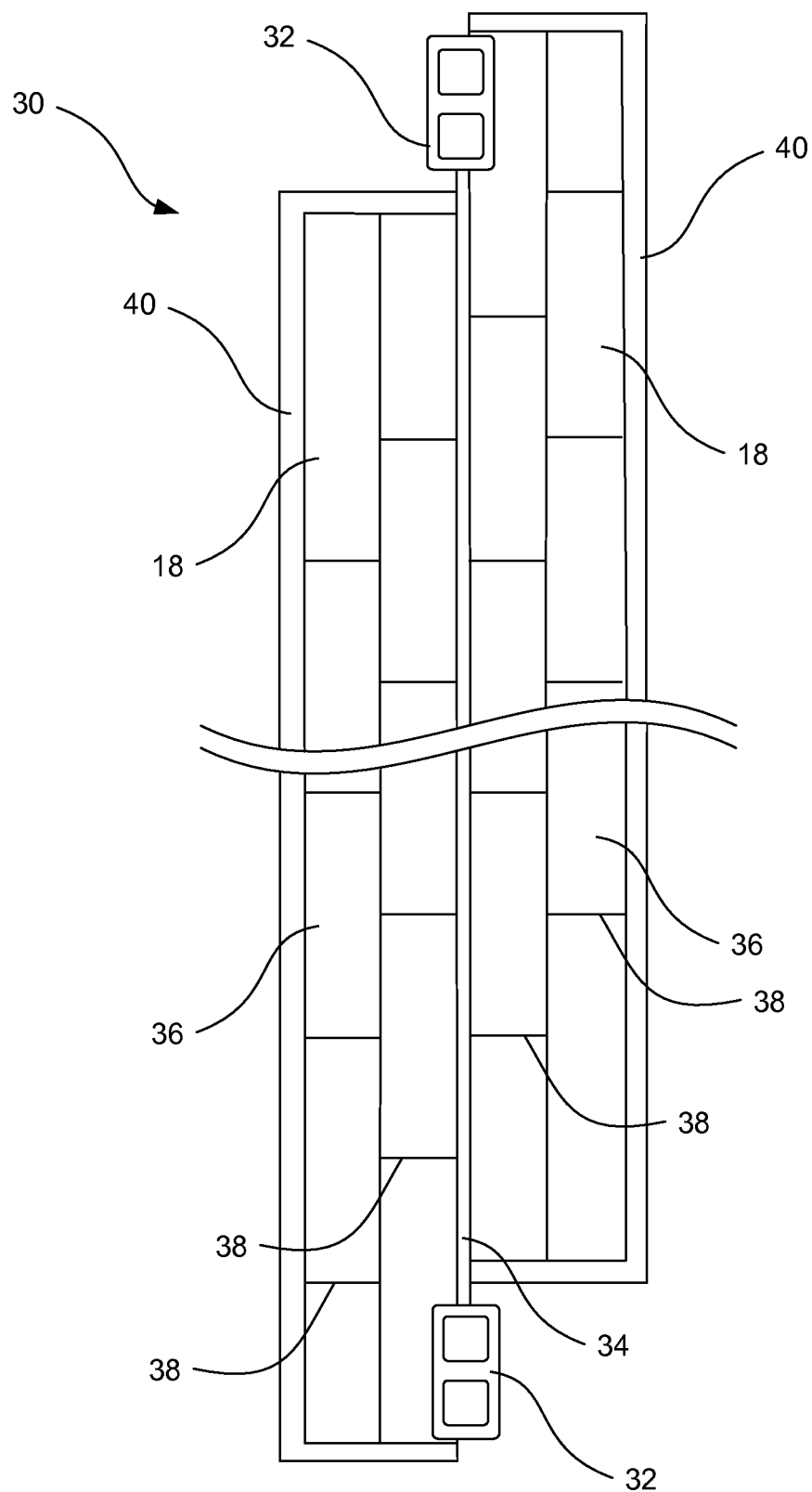
FIG. 5 shows an exemplary climate control panel.

As may be appreciated, the climate control panels formed as discussed above may be substantially planar in shape. For example, FIG. 5 shows one embodiment of a climate control panel 30. Each climate control panel 30 may be connected to other panels, such as by slide locks 32. The climate control panel 30 illustrated in FIG. 5 includes a structural stress panel 34 configured to extend between the various slide locks 32 or other connectors between panels. The stress panel 34 separates two two-layer honeycomb structures 36, each of which is formed as discussed above. Aluminized Mylar ribs 38 of each of the honeycomb structures 36, and therefore the honeycomb chambers 18, are offset or staggered from each other (as per FIG. 4) within each two-layer honeycomb structure 36 and between the two honeycomb structures 36 to minimize conductive heat transfer of the climate control panel 30.

Each of the two-layer honeycomb structures 36 is attached to and/or encased in an outer structural member 40. The outer structural member 40 may be insulating as well as structural. As one example, the outer structural member 40 may be formed of expanded polystyrene, and may be glued or otherwise attached to the two-layer honeycomb structures 36. The expanded polystyrene may also be covered with an outer aluminized Mylar layer to increase reflectivity of the climate control panel and further prevent heat transfer through the panel. As may be seen in FIG. 5, the two two-layer honeycomb structures 36 are somewhat offset from each other, minimizing heat transfer at the slide-lock joint between adjacent climate control panels.

The climate control panels 30 may be made in a wide variety of dimensions. In one embodiment, the climate control panel 30 has a total thickness of approximately 1⅛ inches, and a distance from one slide lock 32 to the next slide lock 32 (width) of approximately four feet. The height of each climate control panel 30 in this example may be any height providing the desired functional characteristics. In one example, the height is approximately four feet, and the top and bottom ends may also be provided in a staggered configuration for interaction with slide locks 32.

In some embodiments, the climate control panels 30 may be formed in such a way as to have some curvature. Such panels, which may vary in finished size and shape, may be connected and used to form a wide variety of insulated structure designs. However, it may be appreciated that panels of the type discussed above with respect to FIGS. 1-5 may not be appropriate for every situation where insulation is desired. Therefore, additional embodiments providing more flexibility in insulating shape are discussed below.

Figure 6:
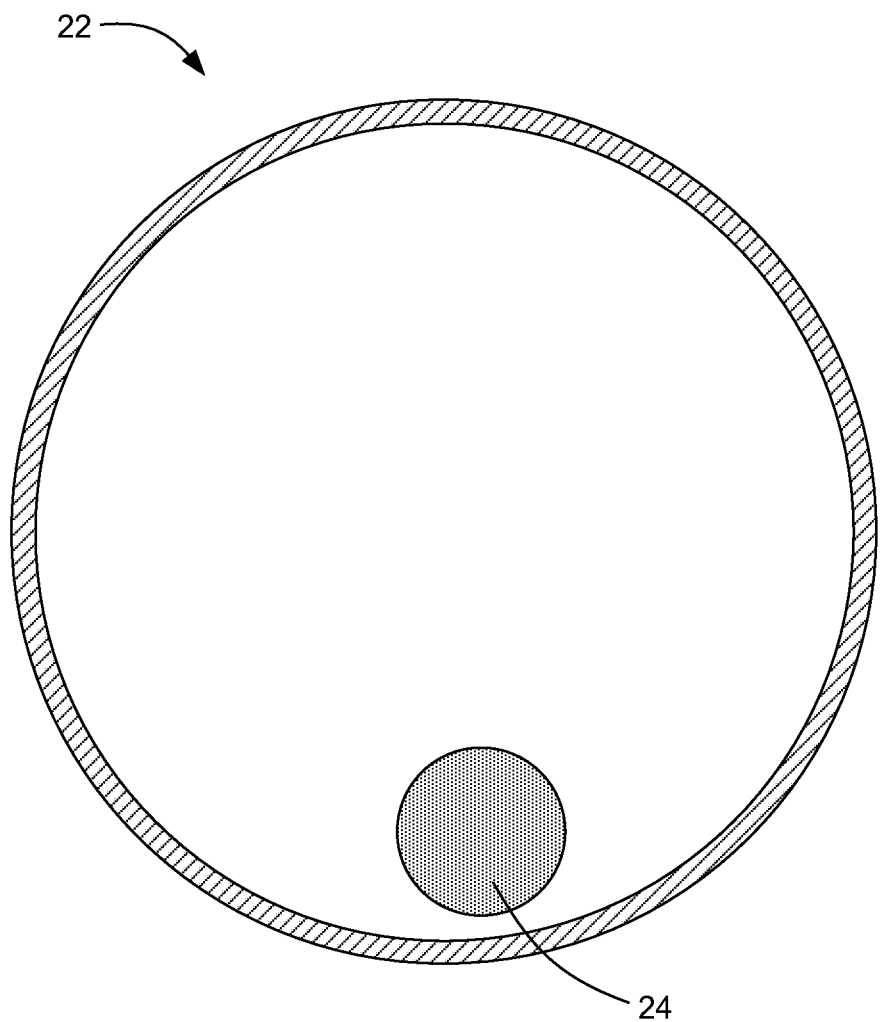
FIG. 6 shows an example of a vacuum bead.
Figure 7:
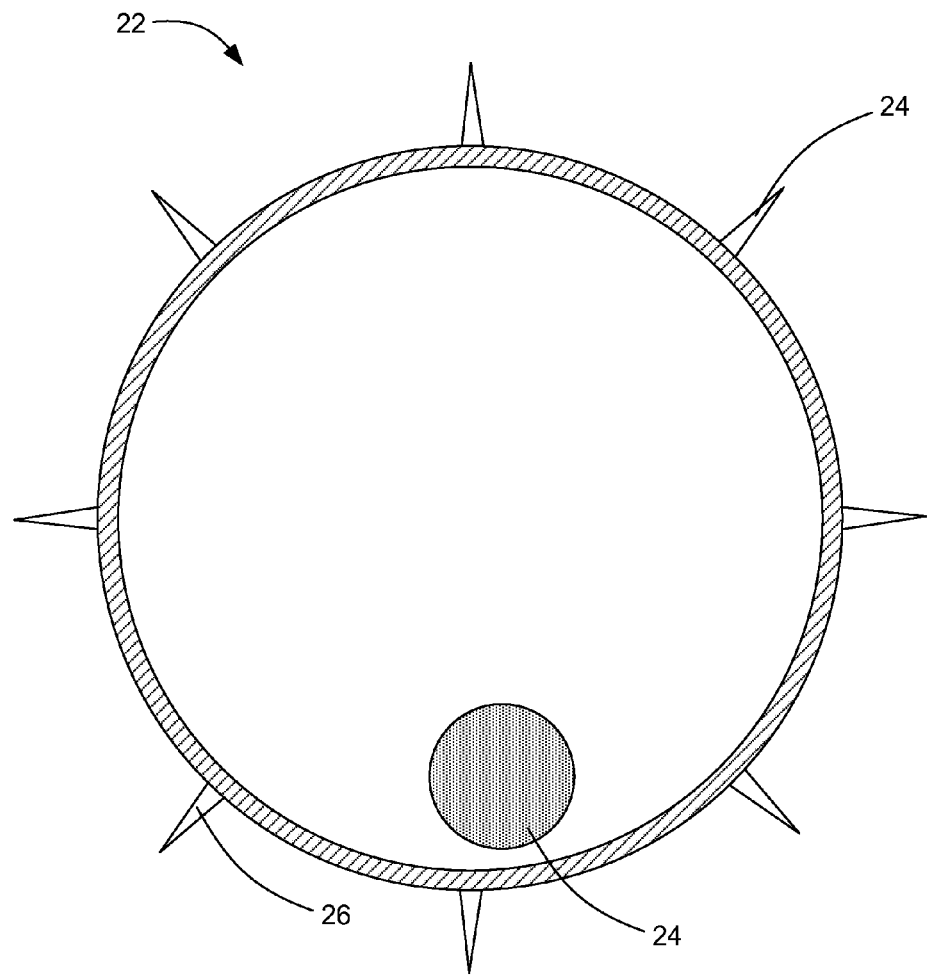
FIG. 7 shows an alternate example of a vacuum bead having point standoffs.

In an additional type of embodiment, insulation is provided by a plurality of vacuum beads. This technology provides a manufacturing process for a vacuum insulation system. It can be panelized and cut to fit the required insulation size, blown into wall cavities, and/or placed in a matrix and molded to any of a variety of shapes, such as curved shapes. These types of embodiments are shown in FIGS. 6-8, which show various embodiments of vacuum beads 22.

The vacuum beads 22 may be made in a pressurized chemical compounds reaction chamber. The vacuum beads include plastic spheres with a magnetically operable membrane capsule 24 inside each sphere. The plastic spheres utilize an inherently-strong structural shape that can be very thin and withstand the forces of an inner near vacuum in compression. The vacuum stops heat transfer through it. The thin walls lessen conductive heat transfer. Further, conductive heat transfer may be minimized by making the sphere with small point standoffs 26 placed so only the standoffs make contact with all of the other spheres, as illustrated in FIGS. 7 and 8. The principle is similar to grains of sand in a desert—only those on the surface of a desert are hot. Remove the grains of sand down a small amount, and they are cold. The points of the crystals touch and stop conductive heat transfer except at that small point of contact.

Figure 8:
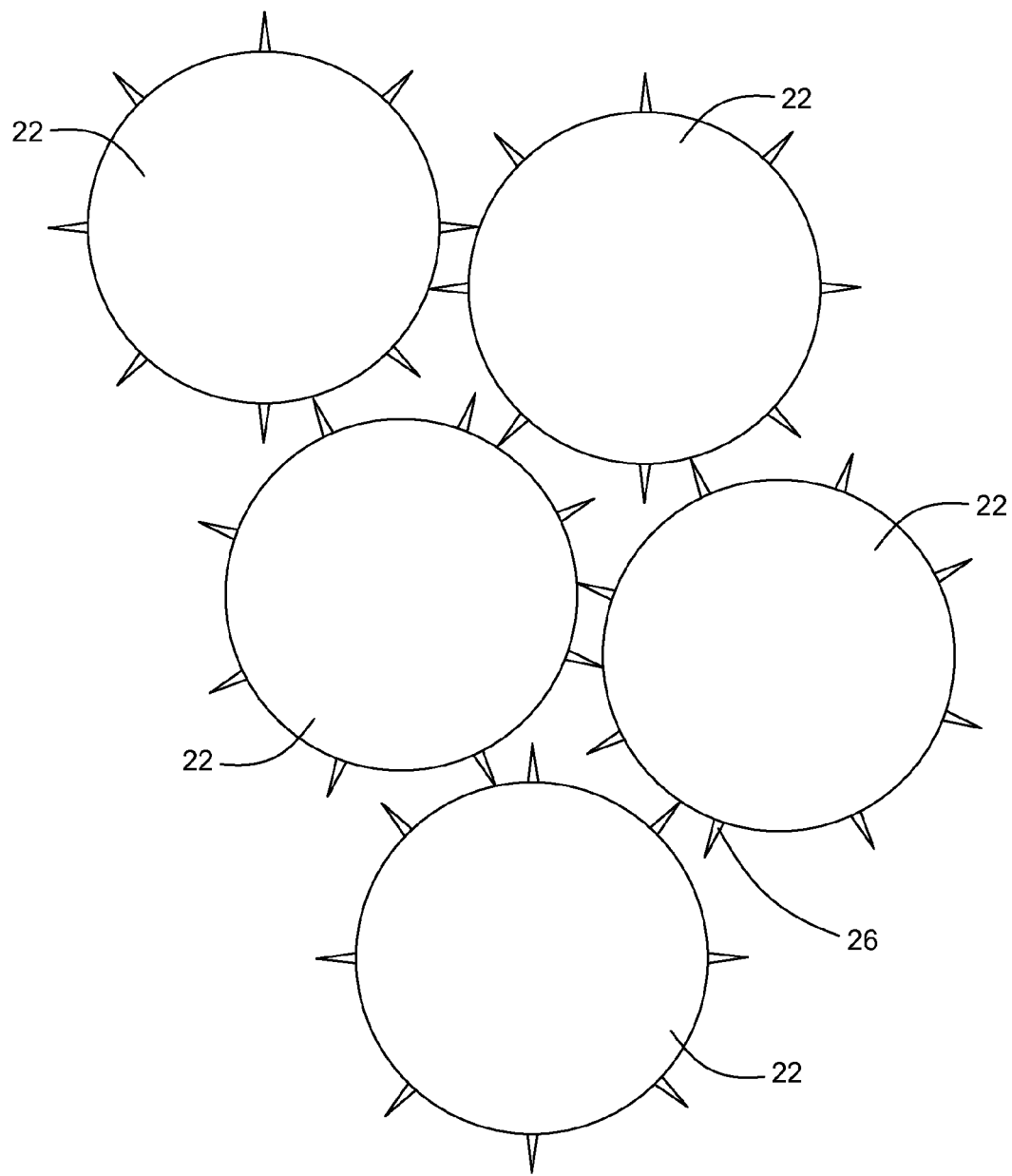
FIG. 8 shows a plurality of vacuum beads showing functioning of point standoffs.

Similarly, as shown in FIG. 8, where vacuum beads 22 having the point standoffs 26 are placed next to one another, the only conductive heat transfer occurs at the points where the point standoffs 26 contact other vacuum beads 22. The specific size, placement, number, and relative dimensions of the point standoffs 26 illustrated in FIGS. 6 and 7 are by way of illustration only, and may be exaggerated in the Figures for illustration purposes. Therefore, the point standoffs 26 may be sized, numbered, and placed so as to minimize the surface area of contact between adjacent vacuum beads 22 while also minimizing the interstitial space between vacuum beads 22 available for convective heat transfer around the vacuum beads 22.

In some embodiments, the process of forming the spheres is initiated in a pressurized $CO_2$ chamber, where other residual gasses have been removed to leave only substantially-pure $CO_2$. This causes only substantially-pure $CO_2$ to be inside of each sphere. The magnetically-operable membrane capsule 24 is placed in each sphere. The magnetically-operable membrande capsule contains the reducing agent chemicals. Once the capsule is placed in each sphere, the sphere is sealed. The spheres are then dipped in a non-melt coating of high temperature plastic or ceramic material. They are then dipped in an aluminum bath, and each sphere therefore has a substantially-homogenous and impervious coating of aluminum applied to its exterior. The point standoffs 26, if present, may be added to the spheres either after or before applying the coating of aluminum, or at any other appropriate time of construction of the vacuum beads 22. The spheres are then structurally complete.

A magnetic force is applied to each sphere, which releases the component compounds in the magnetically-operable membrane capsules. Various compounds and combinations of compounds may be used as reducing agents, including calcium oxide and calcium hydroxide, as discussed above. The reaction of the above-listed reducing agents produces a vacuum of approximately 24 millibars and a solid precipitate. There is no $CO_2$ left over from the reaction, and the vacuum bead 22 is complete and ready for use in forming more complex insulated structures. The completed vacuum bead 22 is highly insulating due to the near vacuum, and the thin walls are resistant to much conductive heat transfer. The vacuum beads 22 are also highly reflective, eliminating or greatly reducing radiant heat gain/loss from a conditioned space. The impervious aluminum coating of the vacuum beads 22 maintains the vacuum and superior insulation for very long periods of time.

In some instances, it may be desirable to manufacture and use vacuum beads 22 in multiple sizes. As discussed above, the vacuum beads 22 are highly insulating, and may be used in a wide variety of circumstances; however, the substantially-spherical nature of the vacuum beads 22 causes some space to remain when a plurality of vacuum beads 22 are placed together, such as in an insulating panel or insulating space. The space in between adjacent vacuum beads 22 is subject to some convective heat transfer. Therefore, it may be desirable to minimize the space available between vacuum beads 22. The space between vacuum beads that is available to air for convective heat transfer may be minimized by using different sizes of vacuum beads 22, where the smaller vacuum beads 22 nest in open spaces between the larger vacuum beads 22.

Other methods of providing vacuum encapsulation for climate control panels may be illustrated with respect to FIGS. 9-13. These illustrated embodiments share many features with the embodiments discussed with respect to FIGS. 3-5. A primary difference between the embodiments of FIGS. 9-13 and the embodiments of FIGS. 3-5 is that the structure separating the various honeycomb chambers in FIGS. 9-13 is not formed from aluminized Mylar sheets as in FIGS. 3-5, but is instead formed from a piece of formed plastic.

Figure 9:
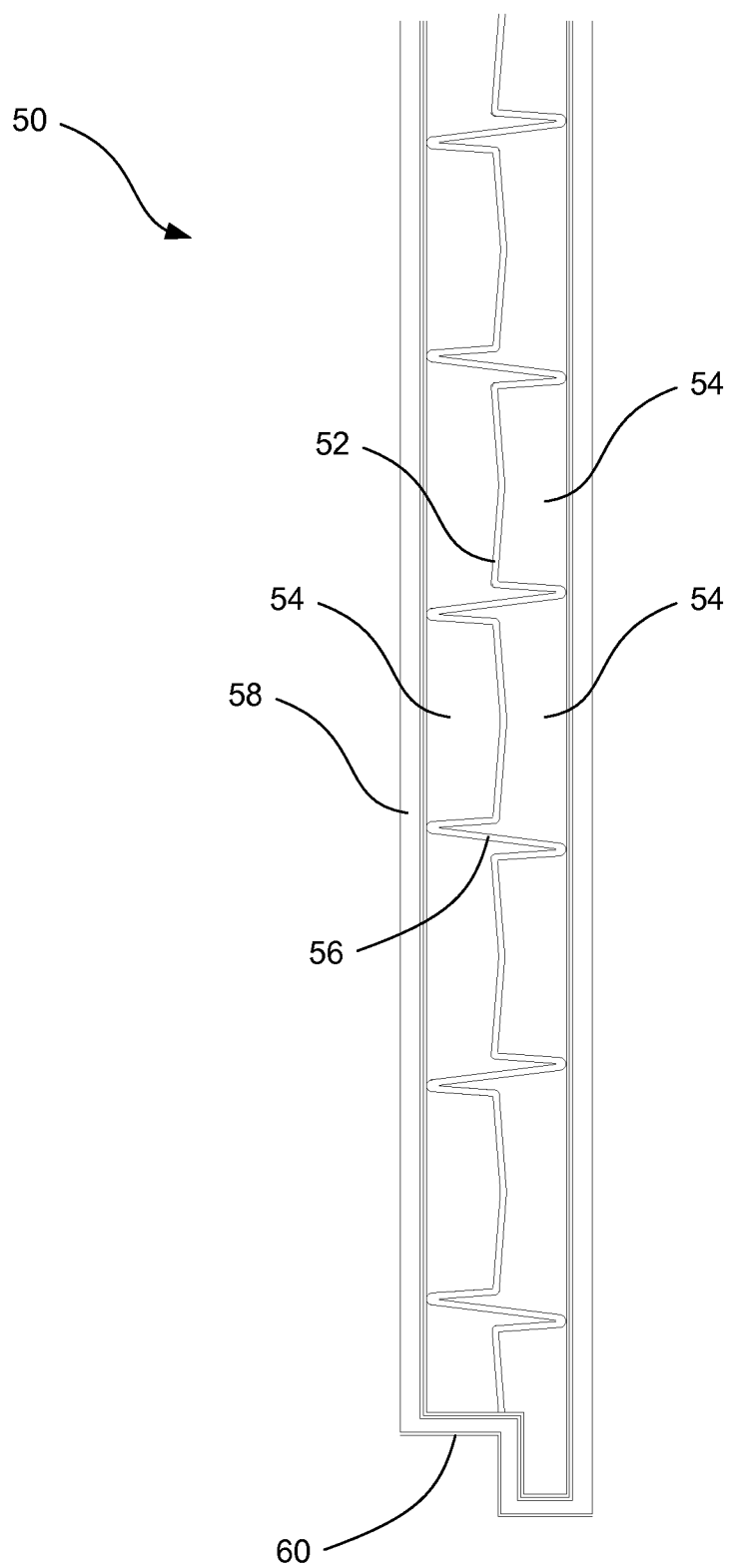
FIG. 9 illustrates a cross-sectional view of an embodiment of a portion of a climate control panel.

A cross-sectional view of a portion of a representative climate control panel 50 is shown in FIG. 9. The climate control panel includes a sheet 52 of formed plastic. The sheet 52 is formed by any of a variety of processes (such as thermoforming) to form a plurality of honeycomb chambers 54. As may be seen in FIG. 9, the forming or molding of the sheet 52 forms the honeycomb chambers 54 on both sides of the sheet 52 at corresponding positions, although other types of forming may be used that position the honeycomb chambers 54 on both sides of the sheet 52 at offset positions. In the forming process, a plurality of ribs 56 or bents are formed that both divide adjacent honeycomb chambers 54 and provide structural strength to the climate control panel 50 against the compressive forces that will be experienced once the vacuum is created.

Figure 10:
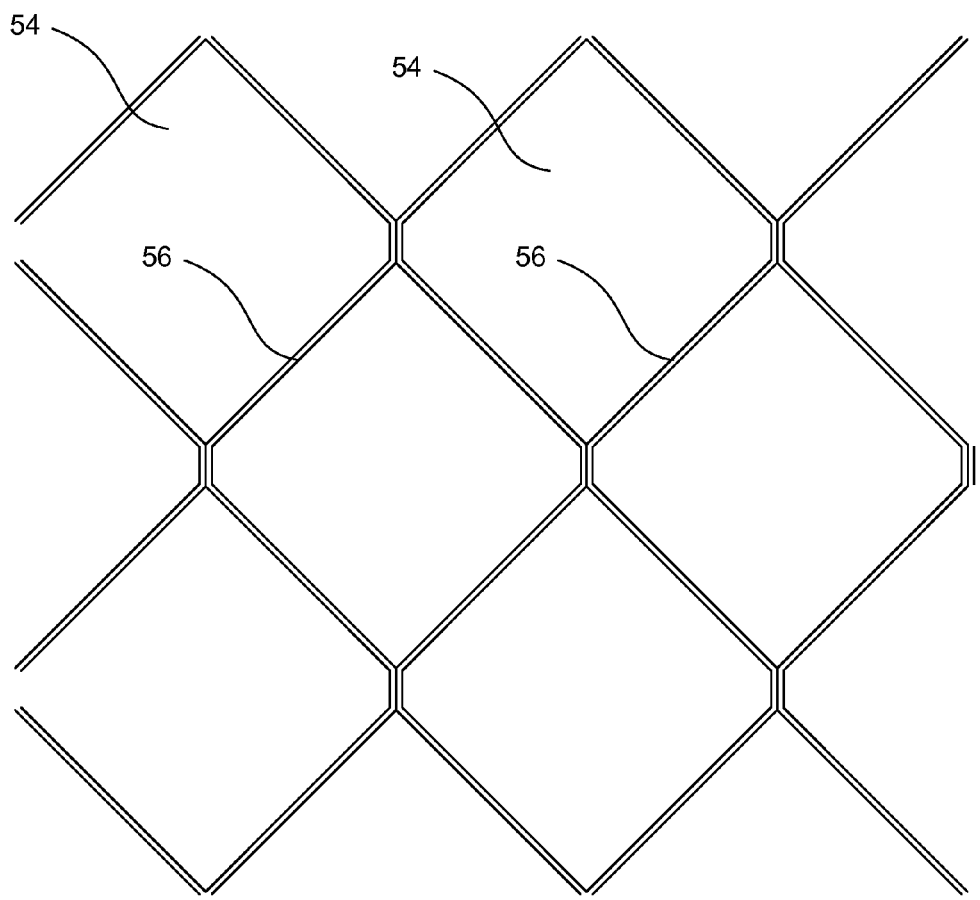
FIG. 10 shows a plan view of an illustrative shape of a honeycomb chamber arrangement.

While the shape of the honeycomb chambers 54 may be provided in essentially any desired shape that is essentially repeatable (e.g square, diamond, hexagonal, etc.) or even a combination of various shapes, FIG. 10 shows a representative view of one possible shape pattern, the view of FIG. 10 being orthogonal to the view of FIG. 9. FIG. 10 does not necessarily show all features of the sheet 52 that are shown in FIG. 9, and is therefore only intended to be representative of one pattern of shapes that may be used to form the sheet 52 in a way so as to form the honeycomb chambers 54. As may be appreciated from FIGS. 9 and 10, the sheet 52 may be formed in an essentially continuous process, for example in very large sheets, and may be cut into any desired size. While the sheet 52 of FIG. 9 is shown as having no overall curve to it, the forming process may be used to provide alternate sheets having bends or curves of various degrees so as to provide climate control panels having such features, such as to facilitate curved and domed constructions and the like.

Returning to FIG. 9, the sheet 52 is shown as a single sheet with the honeycomb chambers 54 formed on each side thereof by the forming process. An alternative to such a configuration would be to form the honeycomb chambers 54 from more than one sheet of plastic, such as by having one sheet with one side's honeycomb chambers 54 formed therein attached to another sheet with the other side's honeycomb chambers 54 formed therein. The foregoing are merely examples of ways the honeycomb chambers 54 could be formed. The forming process may be accomplished by of a thermoset roller that creases the sheet 52 into the honeycomb shapes. It at least some embodiments, a layer of aluminum foil or the like can be placed and connected (e.g. glued) on either side of the sheet 52. As with the embodiments discussed above, the chemical for the vacuum-creation process is placed inside each honeycomb chamber 54 and then each of the honeycomb chambers 54 is sealed in a pure $CO_2$ environment. The sealing may occur with one or more layers and by a variety of fashions. An outer structural layer 58 (which may actually be formed of multiple layers) is thus formed and serves to provide structural strength to the climate control panel 50.

In some embodiments, the placing of the chemical for the vacuum-creation process along with the sealing of the honeycomb chambers 54 occurs in a low-temperature environment whereby the chemical reaction that results in creation of the vacuum is suppressed. The chemical reaction is then activated and the vacuum created, after the outer structural layer 58 has been added to the climate control panel 50, such as by heat energy (e.g. infrared). In other embodiments, the chemical is placed in the honeycomb chambers 54 in an environment other than pure $CO_2$, and the chemical is enclosed by a membrane that is degradable in a pure $CO_2$ environment. The panel 50 is then placed in a pure $CO_2$ environment and relatively-quickly sealed before the membrane degrades. After the honeycomb chambers 54 are sealed, the membrane degrades and the chemical reaction creating the vacuum occurs. If necessary, heat may be added to assist the reaction.

Climate control panels 50 as so formed can be made in curved or straight forms. Any glue bonds in the structure are only stressed by way of inward forces caused by the vacuum. Therefore, there is only minimal glue stress. In at least some embodiments, initiation of the reaction can be delayed until the climate control panels 50 are in place, further minimizing stresses on the glued portions of the climate control panels 50. Manufacturing is simple and the total number of components of the climate control panels 50 is small and the components are readily available and adaptable for use with different components. Because of the many individual honeycomb chambers 54, the climate control panels 50 can readily be cut in the field without jeopardizing the vacuum of any honeycomb chambers 54 not actually cut (the only loss of vacuum is immediately adjacent the cut). As may be seen in FIG. 9, the ends of the climate control panels 50 may be formed with a rabbet 60 that permits adjacent panels 50 to overlap in a way that maintains insulation at the joints.

Figure 11:
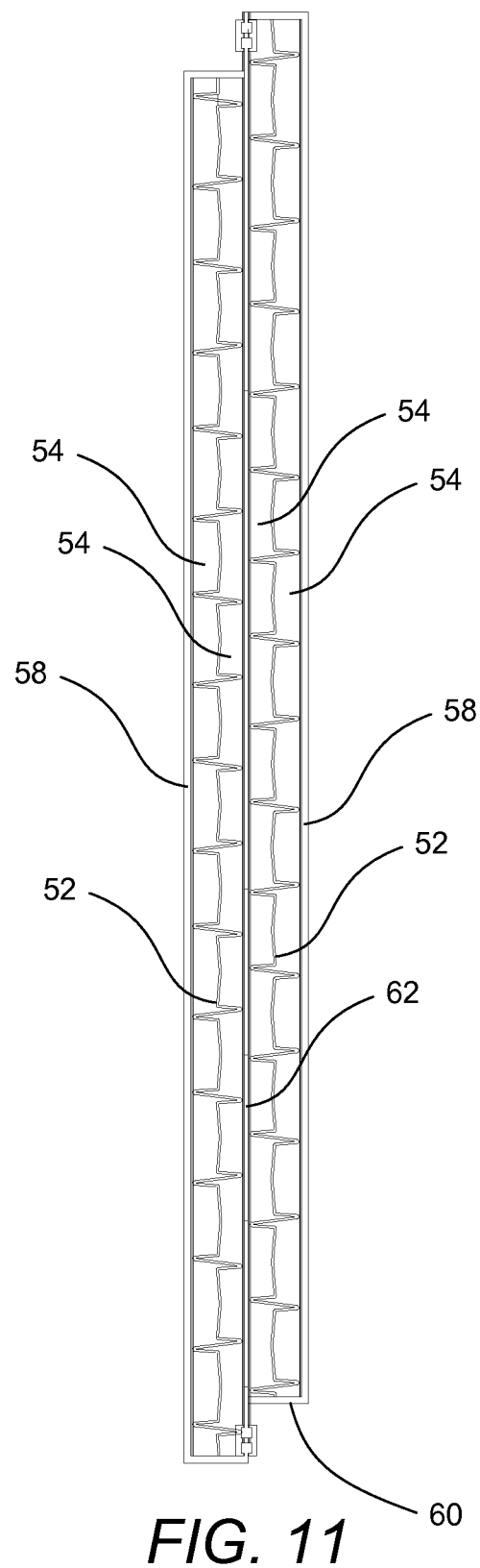
FIG. 11 shows a cross-sectional view of an embodiment of a climate control panel.

The construction of the climate control panel 50 as shown in FIG. 9 uses a single sheet 52 resulting in two layers of honeycomb chambers 54. When additional insulation is desired, multiple such constructions may be layered as is illustrated in FIG. 11. In this embodiment, the climate control panel 50 includes four layers of honeycomb chambers 54. The climate control panel 50 still includes the rabbet 60, and provision may be made for the panels to be connected by way of the slide locks 32. A polyethylene terephthalate (e.g. Dacron) thermal break layer 62 in between the two sets of honeycomb chamber panels may provide a connection between the slide locks 32. It may be noted that the honeycomb chambers 54 of one half of the illustrated climate control panel 50 are offset from the honeycomb chambers 54 of the other half of the climate control panel 50 so as to minimize conductive heat transfer.

Figure 12:
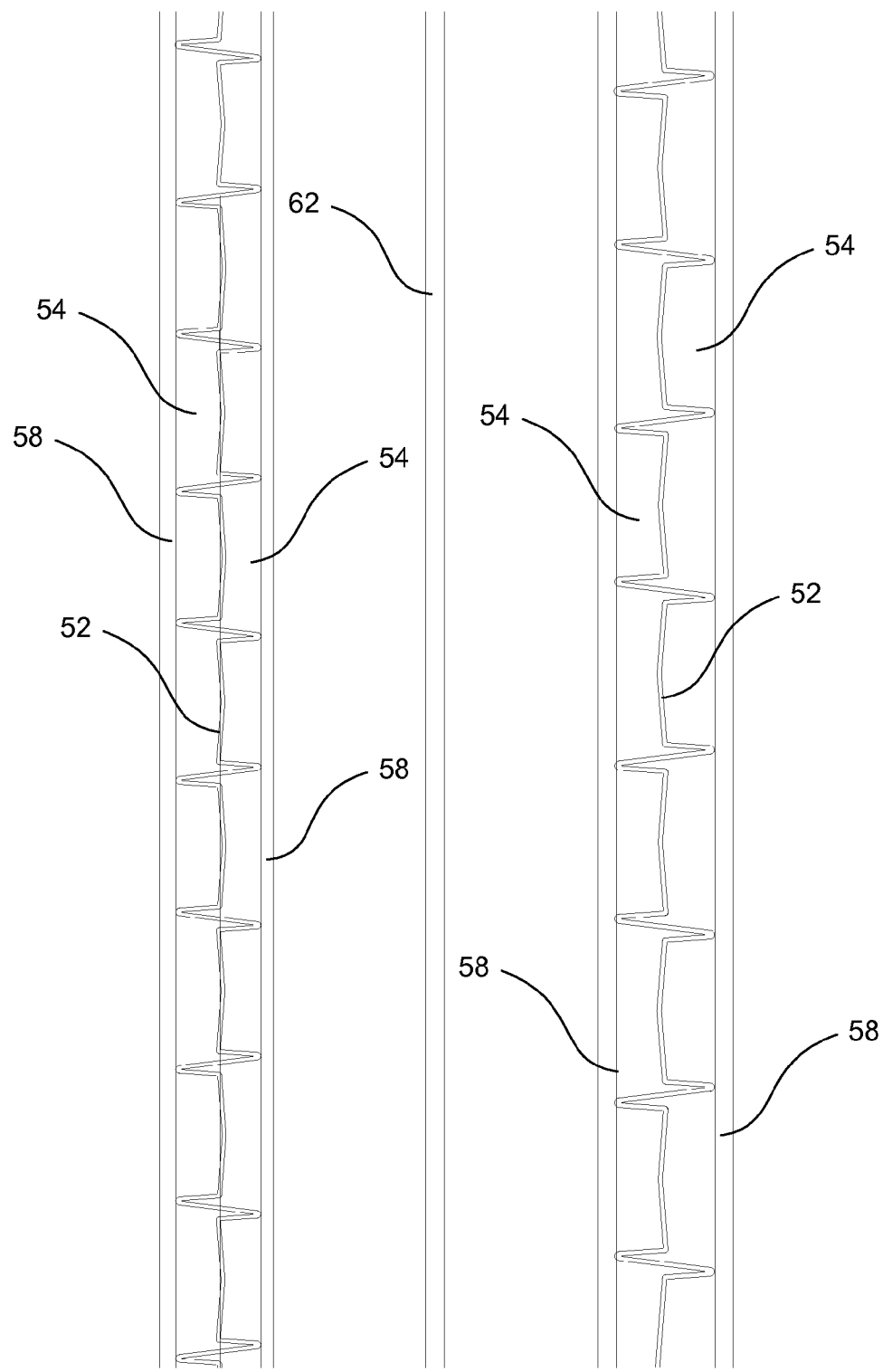
FIG. 12 shows an exploded cross-sectional view of a portion of an embodiment of a climate control panel.
Figure 13:
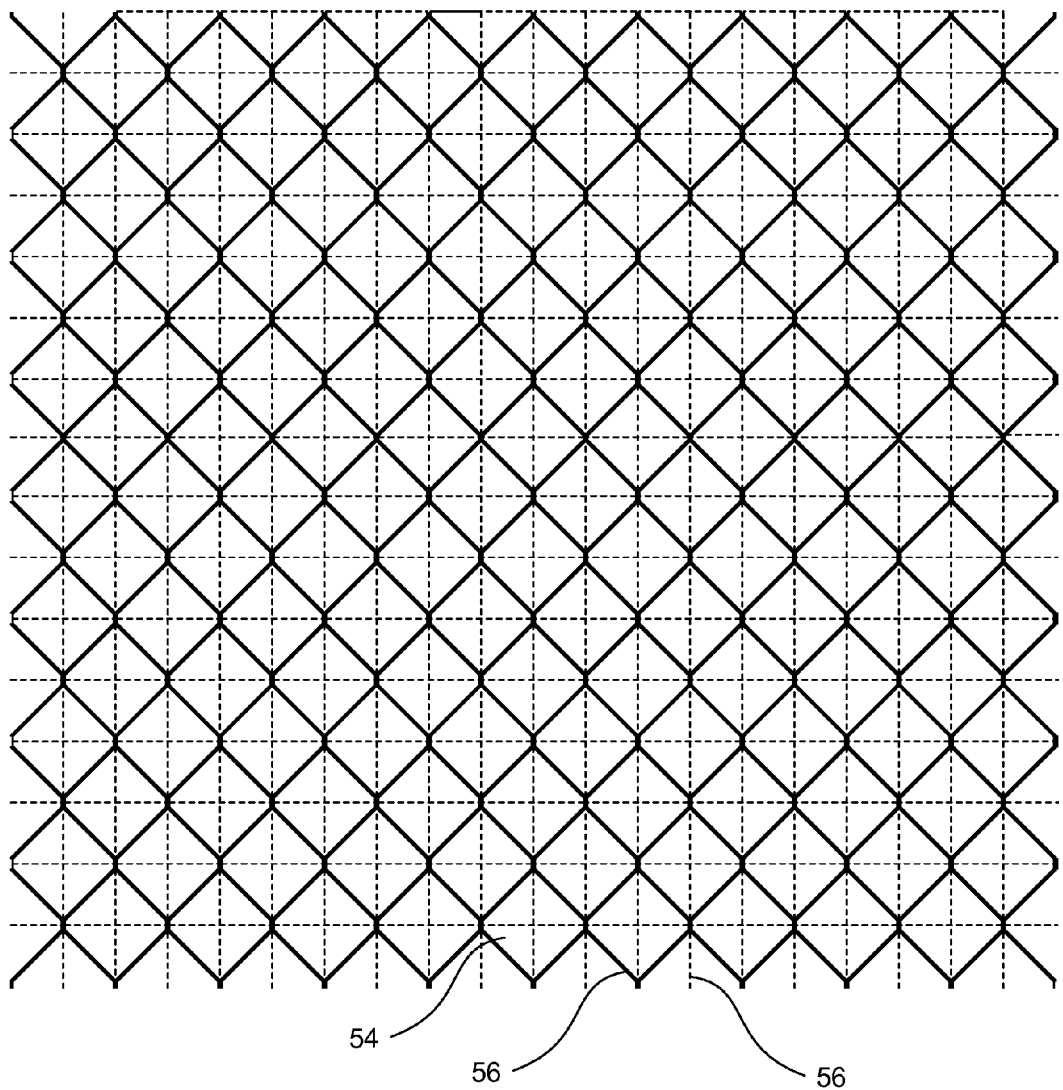
FIG. 13 shows an illustrative plan view of various layers of honeycomb structure.

FIG. 12 illustrates and exploded view of a portion of the climate control panel 50 of FIG. 11. FIG. 13 illustrates a plan view showing another way in which honeycomb chambers 54 of different layers can offset from one another to reduce conductive heat transfer between layers (e.g. through the ribs 56). The honeycomb chambers 54 of different layers may be offset and in a similar orientation, they may be offset and rotated with respect to each other, or they may simply be rotated with respect to each other.

Climate control panels such as those discussed herein (e.g. climate control panels 30, climate control panels 50, and climate control panels incorporating vacuum beads 22) can be used in a variety of construction situations to provide insulation. Because of the low cost of providing structural strength as well as good insulation, the climate control panels provide features not otherwise available. In addition to the advantages discussed above, the panels are puncture and impact resistant, and incorporate redundancy. Even if a puncture occurs the results in loss of vacuum in one or more honeycomb chambers 54, the adjacent chambers 54 (both laterally and through the thickness of the panel are not broken and remain insulating. Existing vacuum panel methods rely on a single vacuum balloon that, once punctured, results in an almost complete loss of insulation. As climate control panels in accordance with embodiments of the invention only lose insulation or a portion of the insulation in a very-localized area, they provide clear advantages over existing vacuum insulation systems.

As the panels are both structural, insulating, and light, they can be used in ways that protect against the environment as well as against natural disasters. For example, because the panels are light, buildings constructed from the panels that are involved in earthquakes, even if they were to collapse, will cause significantly less injury than existing construction methods. Because the panels are modular and light, buildings made of the panels can be constructed on site rapidly with minimal to no tools. In at least some embodiments, such buildings can be moved between locations readily. These are merely examples of possibilities with the climate control panels.

Figure 14:
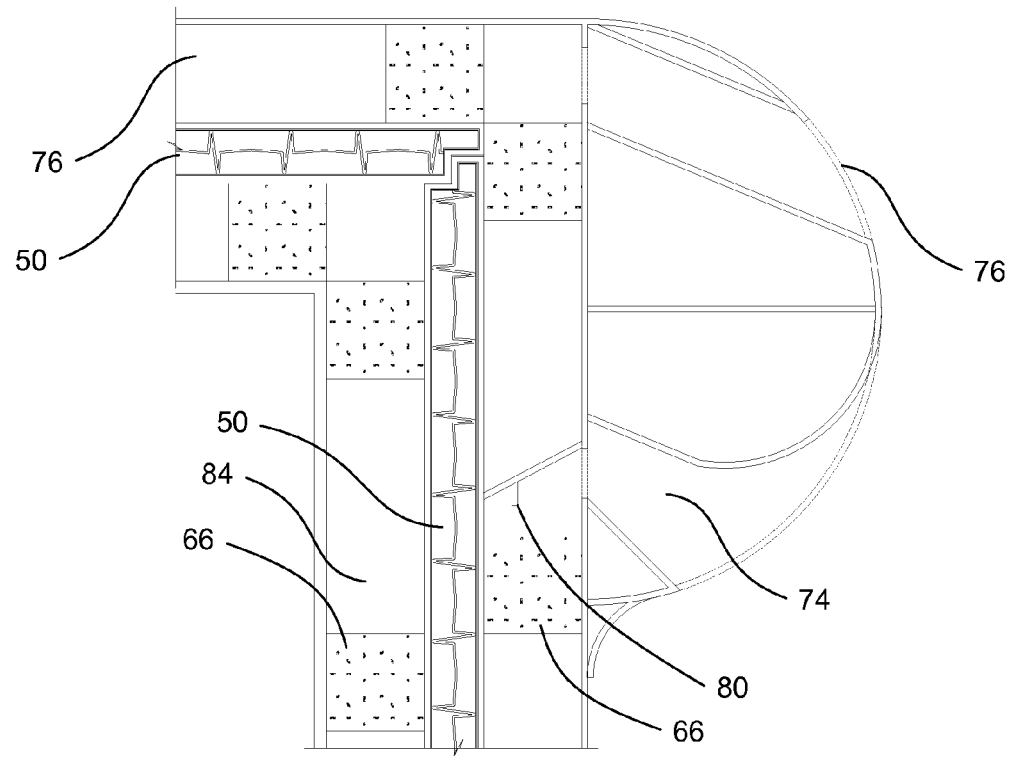
FIG. 14 shows a cross-sectional view of a portion of a structure constructed with climate control panels.
Figure 14:
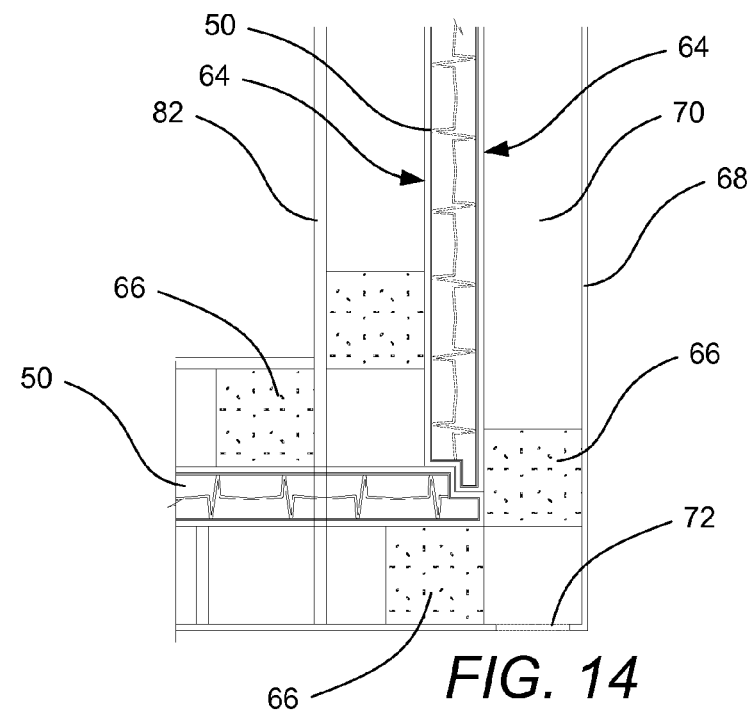

FIG. 14 illustrates one system and method of constructing a structure such as a building incorporating the climate control panels. The system is designed to work with the climate control panels to minimize heat transfer through the climate control panels. In the illustration, the climate control panels used are the climate control panels 50, but it should be understood that other embodiments of the climate control panels discussed herein may be used. The view shown in FIG. 14 illustrates upper and lower corners of one side of the structure, but it should be understood that the other sides and corners may be similarly constructed.

The climate control panels 50 may be covered with a reflective layer 64 to reflect radiant heat and prevent it from passing through the climate control panels 50. On an outer surface of the climate control panel 50 (illustrated in FIG. 14 as being to the right), a plurality of spacers 66 may be attached (e.g. by gluing using a glue such as silicone glue) to the climate control panel 50. The spacers 66 are glued to the climate control panel 50 instead of being attached with fasteners so as not to puncture any of the honeycomb chambers 54. The spacers 66 may be spaced on any desirable spacing and may be of any desirable size to provide any necessary structural and air flow features to the structure, as will be understood from this discussion. They may also be made of any readily-available material. In one example, the spacers 66 are approximately one inch cubes made from nylon and are spaced on the order of approximately sixteen inches on center.

The spacers 66 provide structure to support an outer skin 68 that may be made of a variety of materials, with one specific example being aluminum and other examples including plastic, plywood, composites, or other materials. An aluminum layer as the outer skin 68 or a portion thereof may serve as an additional reflective layer to reduce radiant heat transfer. In areas where it is desirable to have the outer surface of the structure differ from, for example, aluminum or whatever material is used as the outer skin 68, the outer skin 68 may be coated at any desirable time with any desired coating, such as stucco-type coatings, vinyl, paint, and the like.

When the outer skin 68 is made of aluminum and a variety of other materials, it may be reinforced by providing a grid of creases (not shown) in the outer skin 68. For example, in an embodiment of a four foot by eight foot section of the outer skin 68, it may have three lengthwise creases and six widthwise creases. For example, if the outer skin 68 is a thin sheet of aluminum, the creases may have a profile of, for example an approximately three-eighths inch diameter half circle (e.g. having a depth of approximately three-sixteenths inch). The outer skin 68 may be affixed to the spacers 66 using glue or fasteners as long as the fasteners are shorter than the thickness of the spacers 66 (e.g. the fasteners may be ¾-inch fasteners when the spacers 66 have a thickness of one inch). In at least one example, the outer skin 68 is affixed to the spacers 66 at the intersections of the orthogonal creases, and the heads of any fasteners may thereby be contained within the creases and somewhat hidden from view.

Regardless of the location of attachment of the spacers 66, the construction illustrated in FIG. 14 forms an air channel 70 between the climate control panel 50 and the outer skin 68. The air channel 70 adds an additional layer of insulation but more importantly serves to move heated air out of the air channel 70 by a chimney effect as will be discussed below.

A bottom vent 72 is shown at the bottom of the air channel 70. The bottom vent 72 allows relatively-cooler air to enter the air channel 70 as air in the air channel 70 is heated (e.g. by the sun) and rises. A Venturi opening 74 is provided at the top of the air channel 70 near, but not at, the top of the structure. The Venturi opening 74 causes air to flow out of the air channel 70 faster, enhancing the chimney effect and diverting the hot air out and away from the upper edge of the structure. Because the hot air is diverted away, it does not enter into a roof intake 76 that provides intake air to a roof air channel 78 that is connected to a central roof vent or ridge vent (not shown) that allows the roof air channel 78 to function similarly to reduce heat gain through the roof. While the structure surrounding the Venturi opening 74 may be designed to minimize entry of rain into the air channel 70, a drip edge 80 may be provided in the air channel 70 to cause any water that does enter the Venturi opening 74 to drip down away from the surface of the climate control panel 50 so as minimize reduction of the reflective effect of any reflective layer 64.

On the interior of the climate control panel 50, spacers 66 are similarly used, and an interior skin 82 creates an inner air channel 84. The interior skin 82 may be of a material similar to or identical to the material (e.g. aluminum, plastic, etc.) of the outer skin 68, or a different material, but the interior skin 82 may optionally be made thicker and stronger than the outer skin 68. In this way, the interior skin 82 may be made stronger so as to be better capable of bearing loads so that items such as cabinets may be secured to the interior skin 82 (e.g. using fasteners that will not penetrate all the way through the inner air channel 84 to the climate control panel 50. The inner air channel 84 provides an additional layer of insulation to the structure.

The entire thickness of the construction shown in FIG. 14 may be on the order of approximately two and thirteen-sixteenths inches to approximately three inches and may have an insulating value exceeding approximately R56. Of course, the features discussed herein may be varied to achieve different amounts of insulation. The structure made as illustrated in FIG. 14 may be pre-manufactured in sections and then assembled on-site rapidly and with few or no tools (e.g. using the slide locks 32, not shown). A variety of structures of varying sizes may be constructed using systems and methods similar to those illustrated in and discussed with respect to FIG. 14. FIG. 14 is therefore illustrative of features of structures that may be constructed in accordance with embodiments of the present invention.

While FIG. 14 illustrates using climate control panels in accordance with embodiments of the invention to construct a structure, other embodiments may be used for other applications where an insulating structural panels is desired. For example, because most windows have less insulation value than the walls surrounding them, windows are a common source of heat loss in most residential or business buildings. Because standard insulation typically takes up space so that the trapped air can act as an insulator, it is difficult to place insulation over the glass without completely obscuring the view there through and in a way that the insulation can be removed when viewing through the window is desired.

Embodiments of the invention may be used to provide a panel in the form of a window shutter. A climate control panel having a desired size, shape, and R value is constructed according to the principles discussed herein. For example, these panels may be formed of a size of approximately one and one-half inch bigger than the window opening over which the shutter will be placed. The panels may be formed in two pieces with an interlocking center so that when the panels are applied by hinges to the edge of a window, the shutters can be closed in typical shutter fashion and sealed together. Alternatively, the shutters may be mounted on sliding tracks. One or more of such shutters may be used to shutter and insulate a window, as needed and desired. A rubberized gasket may also be applied to the inside of the shutter so that it will seal with the window frame thereby dramatically slowing the flow of heat through the window. An exterior of the shutter may be provided with ornamental features to make it resemble a standard shutter.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method for manufacturing a climate control panel comprising:

forming a panel having a plurality of adjacent honeycomb chambers, each of the honeycomb chambers being open at an end corresponding to an outer surface of the panel and otherwise being substantially enclosed and impervious to gases;

placing a carbon dioxide reducing agent into each of the honeycomb chambers;

locating the panel in a substantially-pure carbon dioxide environment;

sealing the honeycomb chambers so that each honeycomb chamber contains substantially-pure carbon dioxide and the carbon dioxide reducing agent in an un-reacted state; and causing the carbon dioxide reducing agent in each of the honeycomb chambers to react with the carbon dioxide to create a near vacuum in each of the honeycomb chambers.

2. A method as recited in claim 1, wherein a vacuum-based insulating climate control panel is formed that is capable of being cut to fit without jeopardizing the vacuum-based insulating ability of the panel except at the honeycomb chambers that are opened by the cut.

3. A method as recited in claim 1 wherein at least two honeycomb vacuum layers are created.

4. A method as recited in claim 2, wherein a multi-layer honeycomb structure is created.

5. A method as recited in claim 1, wherein the contents of substantially all of the honeycomb chambers are substantially limited to one of:
   substantially-pure carbon dioxide, the un-reacted carbon dioxide reducing agent, and any device or material separating the carbon dioxide from the carbon dioxide reducing agent; and
   reaction products of a chemical reaction between substantially-pure carbon dioxide and carbon dioxide reducing agent in a near vacuum with any remnants of the device or material previously separating the carbon dioxide from the carbon dioxide reducing agent.

6. A method as recited in claim 1, wherein causing the carbon dioxide reducing agent in each of the honeycomb chambers to react with the carbon dioxide to create a near vacuum in each of the honeycomb chambers comprises applying heat to the honeycomb chambers.

7. A method as recited in claim 6, wherein application of heat causes at least one of:
   melting of a barrier or device separating the carbon dioxide reducing agent from the carbon dioxide; and
   a reaction between the carbon dioxide reducing agent and the carbon dioxide that was previously suppressed by a low temperature.

8. A method as recited in claim 1, wherein the carbon-dioxide reducing agent comprises one of:
   a mixture of calcium oxide and calcium hydroxide; and
   substantially-pure calcium oxide.

\* \* \* \* \*